(12) United States Patent
Sarkar et al.

(10) Patent No.: US 6,587,446 B2
(45) Date of Patent: *Jul. 1, 2003

(54) HANDOFF IN A WIRELESS COMMUNICATION SYSTEM

(75) Inventors: Sandip Sarkar, San Diego, CA (US); Edward G. Tiedemann, Jr., San Diego, CA (US); Joseph P. Odenwalder, Del Mar, CA (US)

(73) Assignee: Qualcomm Incorporated, San Diego, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/372,261

(22) Filed: Aug. 11, 1999

(65) Prior Publication Data

US 2003/0058828 A1 Mar. 27, 2003

Related U.S. Application Data

(63) Continuation-in-part of application No. 09/248,701, filed on Feb. 11, 1999.

(51) Int. Cl.[7] .................................................. H04Q 7/00
(52) U.S. Cl. ...................................... 370/331; 370/332
(58) Field of Search ............................... 370/328, 331, 370/332, 335, 342, 479, 318, 320, 324, 441, 491, 514, 515, 519; 455/13.4, 70, 71, 267, 436, 439, 442, 522, 526, 77, 87, 524, 525

(56) References Cited

U.S. PATENT DOCUMENTS 5,751,725 A  5/1998  Chen .......................... 371/5.5
5,963,870 A * 10/1999  Chheda et al. .............. 455/522
6,073,025 A *  6/2000  Chheda et al. .............. 455/522

(List continued on next page.)

FOREIGN PATENT DOCUMENTS

| EP | 0667726 | 8/1995 |
| EP | 0809365 | 11/1997 |
| GB | 2314734 | 1/1998 |
| WO | 9729611 | 8/1997 |
| WO | 9740592 | 10/1997 |

OTHER PUBLICATIONS

Maria Gustafsson, et al., Compressed Mode Techniques for Inter–Frequency Measurements in a Wide–Band DS–CSMA System, Ericcson Radio Systems, Stockholm, Sweden, IEEE 1997, p. 231–235.

Satarasinghe, et al., "A Novel Method for CDMA Hard Handoff" IEEE pp. 1766–1768 (1996).

*Primary Examiner*—Douglas Olms
*Assistant Examiner*—Phirin Sam
(74) *Attorney, Agent, or Firm*—Philip R. Wadsworth; Kent D. BAker; Sean English

(57) ABSTRACT

A mobile station transmits a plurality of channels including a pilot channel and at least one information channel. In the exemplary embodiment, the base station determines the adequacy of the transmission energy of the reverse link signal in accordance with the received energy of the reverse link pilot signal. In the present invention, the pilot channel transmission power is retained at the level it was prior to the frequency search excursion, while increasing the transmission energy of at least one other channel transmitted by the mobile station. In addition, when the mobile station is not capable of increasing the transmission energy of all of the information channels, the mobile station generates a ranking of the importance of the different information channels and selectively increases the transmission power of those channels.

21 Claims, 9 Drawing Sheets

U.S. PATENT DOCUMENTS 6,078,570 A * 6/2000 Czaja et al. ................ 370/331
6,134,440 A * 10/2000 Black ........................ 455/436
6,154,659 A * 11/2000 Jalali et al. ................ 455/522
6,181,943 B1 * 1/2001 Kuo et al. .................. 455/437
6,185,431 B1 * 2/2001 Li et al. ..................... 455/522
6,188,900 B1 * 2/2001 Ruiz et al. .................. 455/436
6,252,861 B1 * 6/2001 Bernstein et al. ........... 370/331
6,304,755 B1 * 10/2001 Tiedemann, Jr. et al. ... 455/437

* cited by examiner

INTER-FREQUENCY SEARCH EXCURSION TIMING

FORWARD LINK POWER CONTROL INCREASE DURING SEARCH EXCURSION

HANDOFF IN A WIRELESS COMMUNICATION SYSTEM

CROSS-REFERENCE TO RELATED APPLICATION

This application is a continuation in part application of copending U.S. patent application Ser. No. 09/248,701, filed Feb. 11, 1999, entitled "METHOD AND SYSTEM FOR PERFORMING A HANDOFF IN A WIRELESS COMMUNICATION SYSTEM, SUCH AS A HARD HANDOFF".

FIELD OF THE INVENTION

The invention relates to wireless communication system, and, more particularly, to methods and apparatus for providing hard handoffs between cells in such systems.

BACKGROUND OF THE INVENTION

In a code division multiple access (CDMA) system, the vast majority of handoffs happen between cells on the same CDMA channel and use soft handoff procedures. On some occasions, the mobile stations need to perform a handoff between cells on different CDMA channels where such channels are at different radio frequencies (FR), often denoted as inter-frequency hard handoff. Such situations are typically, but not limited to, either a handoff between different operators, a handoff between different RF channels allocated for capacity reasons, or a handoff between different signal modulation technologies.

Before effecting an inter-frequency hard handoff, the mobile station is directed by the base station to tune to the new target frequency, measure the radio environment (e.g., pilot signal strength of the received signals, etc.), and report the measurement back to the base station. Such a procedure is specified in TIA/EIA-95-B and greatly enhances the probability of success of an interfrequency handoff.

An essential requirement of the measurement on the target frequency, often referred to as "search excursion," is to minimize the disruption of the current service on the originating frequency. Handoffs to a second frequency without adequate prior sampling could result in poor signal performance. On the other hand, sampling for long periods of time may cause the signal at the first frequency to be lost completely. The method described below permits the mobile station to minimize the search time and to limit the disruption of service.

SUMMARY OF THE INVENTION

A mobile station transmits a plurality of channels including a pilot channel and at least one information channel. In the exemplary embodiment, the base station determines the adequacy of the transmission energy of the reverse link signal in accordance with the received energy of the reverse link pilot signal. In the present invention, the pilot channel transmission power is retained at the level it was prior to the frequency search excursion, while increasing the transmission energy of at least one other channel transmitted by the mobile station. In addition, when the mobile station is not capable of increasing the transmission energy of all of the information channels, the mobile station generates a ranking of the importance of the different information channels and selectively increases the transmission power of those channels.

BRIEF DESCRIPTION OF THE DRAWINGS

In the figures, like reference numbers identify similar elements. For ease in identifying the discussion of any particular element, the most significant digit in a reference number refers to the figure number in which that element is first introduced (e.g., element 204 is first introduced and discussed with respect to FIG. 2).

DETAILED DESCRIPTION OF THE PREFERRED EMBODIMENTS

A wireless communication system, and, in particular, a method and apparatus for minimizing search excursion time to a target frequency and disruption of current service on an originating frequency is described in detail herein. In the following description, numerous specific details are provided to give a thorough understanding of the invention. One skilled in the relevant technology, however, will readily recognize that the invention can be practiced without these specific details or with alternative elements or steps. In other instances, well-known structures and methods are not shown in detail to avoid obscuring the invention.

Figure 1:
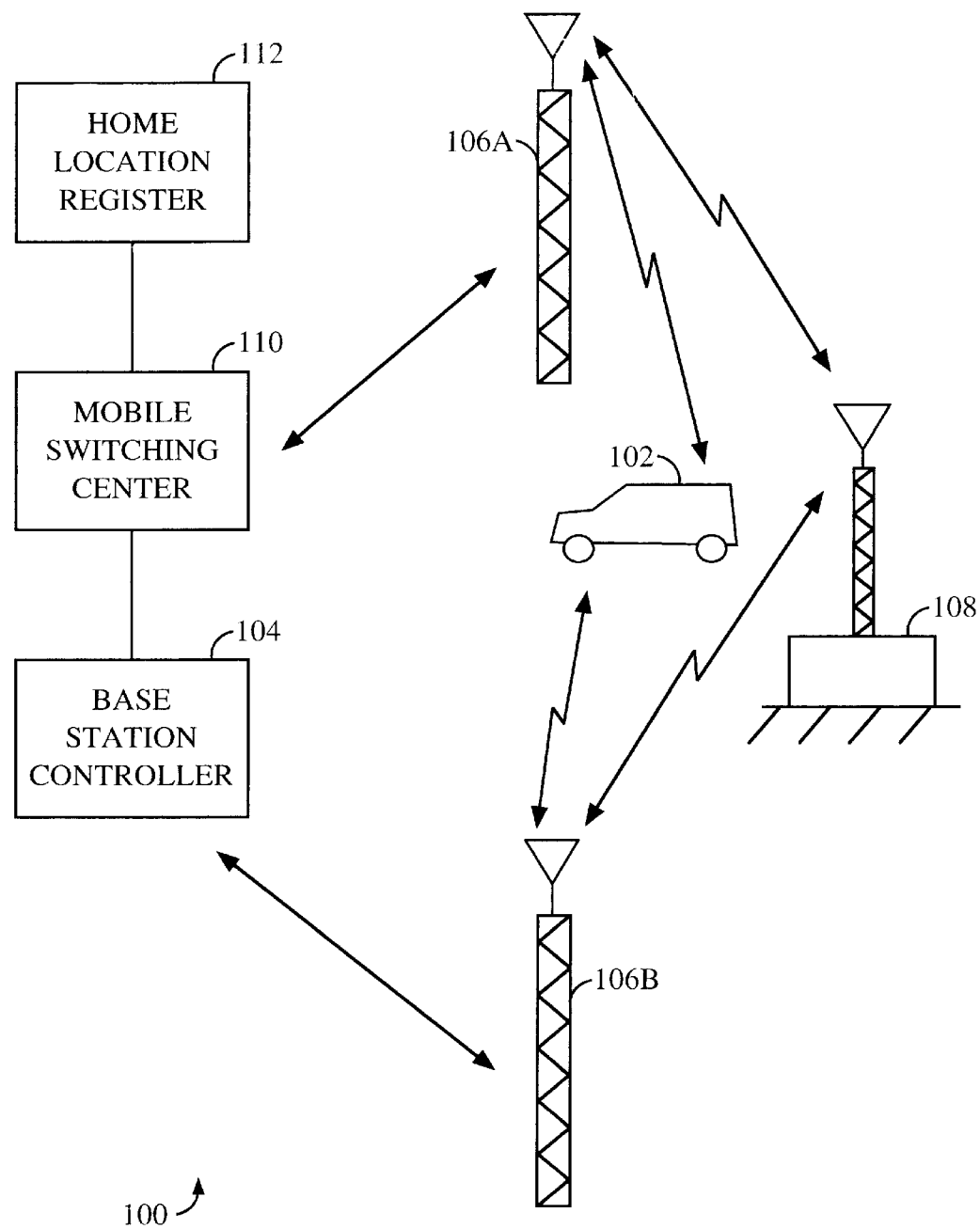
FIG. 1 illustrates a typical wireless communication system that can employ the invention.

FIG. 1 illustrates a cellular subscriber communication system 100 that uses multiple access techniques, such as code division multiple access (CDMA) for communicating between users of user stations (e.g., mobile telephones) and cell sites or base stations. In FIG. 1, a mobile user station 102 communicates with a base station controller 104 by means of one or more base stations 106a, 106b, etc. Similarly, a fixed user station 108 communicates with the base station controller 104, but by means of only one or more predetermined and proximate base stations, such as the base stations 106a and 106b.

The base station controller 104 is coupled to and typically includes interface and processing circuitry for providing system control to the base stations 106a and 106b. The base station controller 104 may also be coupled to and communicate with other base stations, and possibly even other base station controllers. The base station controller 104 is coupled to a mobile switching center 110 that in turn is coupled to a home location register 112. During registration of each user station at the beginning of each call, the base station controller 104 and the mobile switching center 110 compare registration signals received from the user stations to data contained in the home location register 112, as is known in the art. Handoffs may occur between the base station controller 104 and other base controllers, and even between the mobile switching center 110 and other mobile switching centers, as is known by those skilled in this technology.

When the system 100 processes voice or data traffic calls, the base station controller 104 establishes, maintains, and terminates the wireless link with the mobile station 102 and the fixed station 108, while the mobile switching center 110 establishes, maintains, and terminates communications with a public switched telephone network (PSTN). While the discussion below focuses on signals transmitted between the base station 106a and the mobile station 102, those skilled in this technology will recognize that the discussion equally applies to other base stations and to the fixed station 108. The terms "cell" and "base station" are generally used interchangeably herein.

Figure 2:
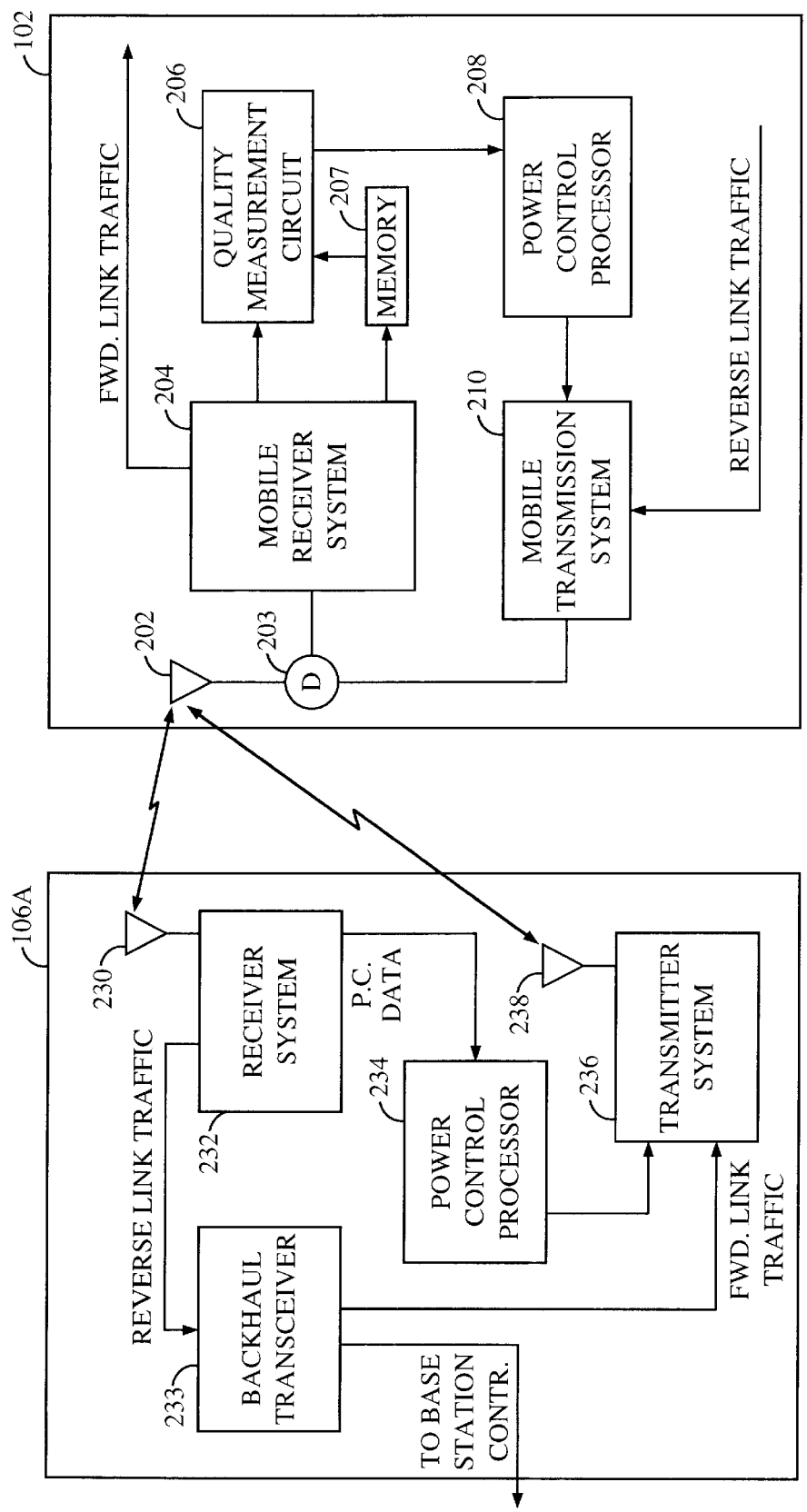
FIG. 2 is a block diagram of typical components found in the wireless communication system of FIG. 1 that can employ the invention.

Referring to FIG. 2, the mobile station 102 includes an antenna 202 that transmits signals to, and receives signals from the base station 106a. A duplexer 203 provides a forward link channel or signal from the base station 106a to a mobile receiver system 204. The receiver system 204 down-converts, demodulates, and decodes the received signal. The receiver system 204 then provides a predetermined parameter or set of parameters to a quality measurement circuit 206. Examples of parameters might include measured signal to noise ratio (SNR), measured received power, or decoder parameters such as symbol error rate, Yamamoto metric, or parity bit check indication. A memory buffer 207, can be included for use with the invention described herein. Additional details regarding operation of the mobile station 102 (and the base station 106a) are found, for example, in U.S. Pat. No. 5,751,725, entitled "METHOD AND APPARATUS FOR DETERMINING THE RATE OF RECEIVED DATA IN A VARIABLE RATE COMMUNICATION SYSTEM," assigned to the assignee of the present invention, and incorporated by reference herein.

The quality measurement circuit 206 receives the parameters from the receiver system 204 and determines a quality measurement signal or power level of the received signal. The quality measurement circuit 206 can generate energy per bit ($E_b$) or energy per symbol ($E_s$) measurements from portions or windows of each frame. Preferably, the energy per bit or energy per symbol measurements are normalized (e.g., $E_b/N_o$), or normalized and include interference factors (e.g., $E_b/N_t$), as is known in the art. Based on these measurements, the quality measurement circuit 206 produces a power level signal.

A power control processor 208 receives the power level signal from the quality measurement circuit 206, compares the signal to a threshold, and produces a power control message based on the comparison. Each power control message can indicate a change in power for the forward link signal. Alternatively, power control processor 208 produces power control messages representing the absolute power of the received forward link signal, as is known in the art. The power control processor 208 produces preferably several (e.g., sixteen) power control messages in response to several power level signals per frame. While the quality measurement circuit 206 and power control processor 208 are generally described herein as separate components, such components can be monolithically integrated, or the operations performed by such components can be performed by a single microprocessor.

A mobile transmission system 210 encodes, modulates, amplifies, and up converts the power control messages, via the duplexer 203 and the antenna 202. In the illustrated embodiment, the mobile transmission system 210 provides the power control message in a predetermined location of an outgoing reverse link frame.

The mobile transmission system 210 also receives reverse link traffic data, such as voice or general computer data, from the user of the mobile station. The mobile transmission system 210 requests a particular service (including power/rate) from the base station 106a based on the traffic data to be transmitted. In particular, the mobile transmission system 210 requests bandwidth allocation appropriate for the particular service. The base station 106a then schedules or allocates bandwidth (power/rate) resources based on requests from the mobile station 102 and other users to optimize such resource allocation, given power constraints of the system. Thus, effectively managing transmission power in the system will permit more effective bandwidth use.

The base station 106a includes a receiving antenna 230 that receives the reverse link frames from the mobile station 102. A receiver system 232 of the base station 106a down converts, amplifies, demodulates, and decodes the reverse link traffic. A backhaul transceiver 233 receives and forwards to the base station controller 104 reverse link traffic. The receiver system 232 also separates the power control messages from each reverse link traffic frame and provides the power control messages to a power control processor 234.

The power control processor 234 monitors the power control messages and produces a forward link transmitter power signal to a forward link transmitter system 236. The forward link transmitter system 236, in response thereto, either increases, maintains, or decreases the power of the forward link signal. The forward link signal is then transmitted via a transmitting antenna 238. Additionally, the power control processor 234 analyzes the quality of the reverse link signal from the mobile station 102 and provides appropriate feedback control messages to the forward link transmitter system 236. The forward link transmitter system 236, in response thereto, transmits the feedback control messages via the transmitting antenna 238 over the forward link channel to the mobile station 102. The transmitter system 236 also receives forward link traffic data from the base station controller 104 via the backhaul transceiver 233. The forward link transmitter system 236 encodes, modulates, and transmits via the antenna 238 the forward link traffic data.

Unless described otherwise herein, the construction and operation of the various blocks and elements shown in FIGS. 1 and 2 and the other figures are of conventional design and operation. Thus, such blocks or elements need not be described in further detail because they will be understood by those skilled in the relevant art. Any additional description is omitted for brevity and to avoid obscuring the detailed description of the invention. Any modifications necessary to the blocks of the communication system 100 of FIGS. 1 and 2, or the other systems shown therein can be readily made by one skilled in the relevant art based on the detailed description provided herein.

The closed-loop power control system for user stations, including the mobile station 102 and base station 106a, dynamically adjusts the transmit power for each user based on the user's propagation conditions to yield the same frame error rate (FER) for each user for voice services (e.g., a 1% FER). As noted above, many users, however, may request transmission for data services in lieu of voice services, such as facsimile, e-mail and general computer data, all of which are insensitive to delay but require a lower FER (or lower bit error rate (BER)). A user may even require video services, which not only require a lower FER but are sensitive to delay. The base station 106a dynamically assigns transmission rates based on requests from each user under known techniques.

Under one CDMA standard, described in the Telecommunications Industry Association's TIA/EIA-95-A Mobile Stations-Base Station Compatibility Standard For Dual-Mode Wideband Spread Spectrum Cellular System, each base station transmits pilot, sync, paging, and forward traffic channels to its users. The pilot channel is an unmodulated, direct-sequence spread spectrum signal transmitted continuously by each base station. The pilot channel enables each user to acquire the timing of the channels transmitted by the base station, and it provides a phase reference for coherent demodulation. The pilot channel also provides a means for signal strength comparisons between base stations to determine when to hand off between base stations (such as when moving between cells). Recent CDMA modulation techniques have been proposed using dedicated time multiplexed ("DTMP") pilot symbols. Under the DTMP approach, separate pilot symbols are time multiplexed on each user's traffic channel. Each user sequentially de-spreads the pilot symbols (and information symbols). There is also an alternative common code multiplexed pilot ("CCMP") approach, where one co-channel is dedicated to broadcasting a pilot signal. No pilot symbols are multiplexed with dedicated channels, and all users de-spread both the pilot symbols and the modulated information signals in parallel. Such systems are described in more detail in U.S. patent application Ser. No. 09/144,402, filed Aug. 31, 1998, now U.S. Pat. No. 6,310,869, issued Oct. 30, 2001, to Holtzman et al., entitled "METHOD AND APPARATUS FOR REDUCING AMPLITUDE VARIATIONS AND INTERFERENCE IN COMMUNICATION SIGNALS, SUCH AS WIRELESS COMMUNICATION SIGNALS EMPLOYING INSERTED PILOT SYMBOLS," now U.S. Pat. No. 6,310,869, issued Oct. 30, 2001 to Holtzman et al. assigned to the same assignee of this invention.

Inter-Frequency Search

Figure 3:
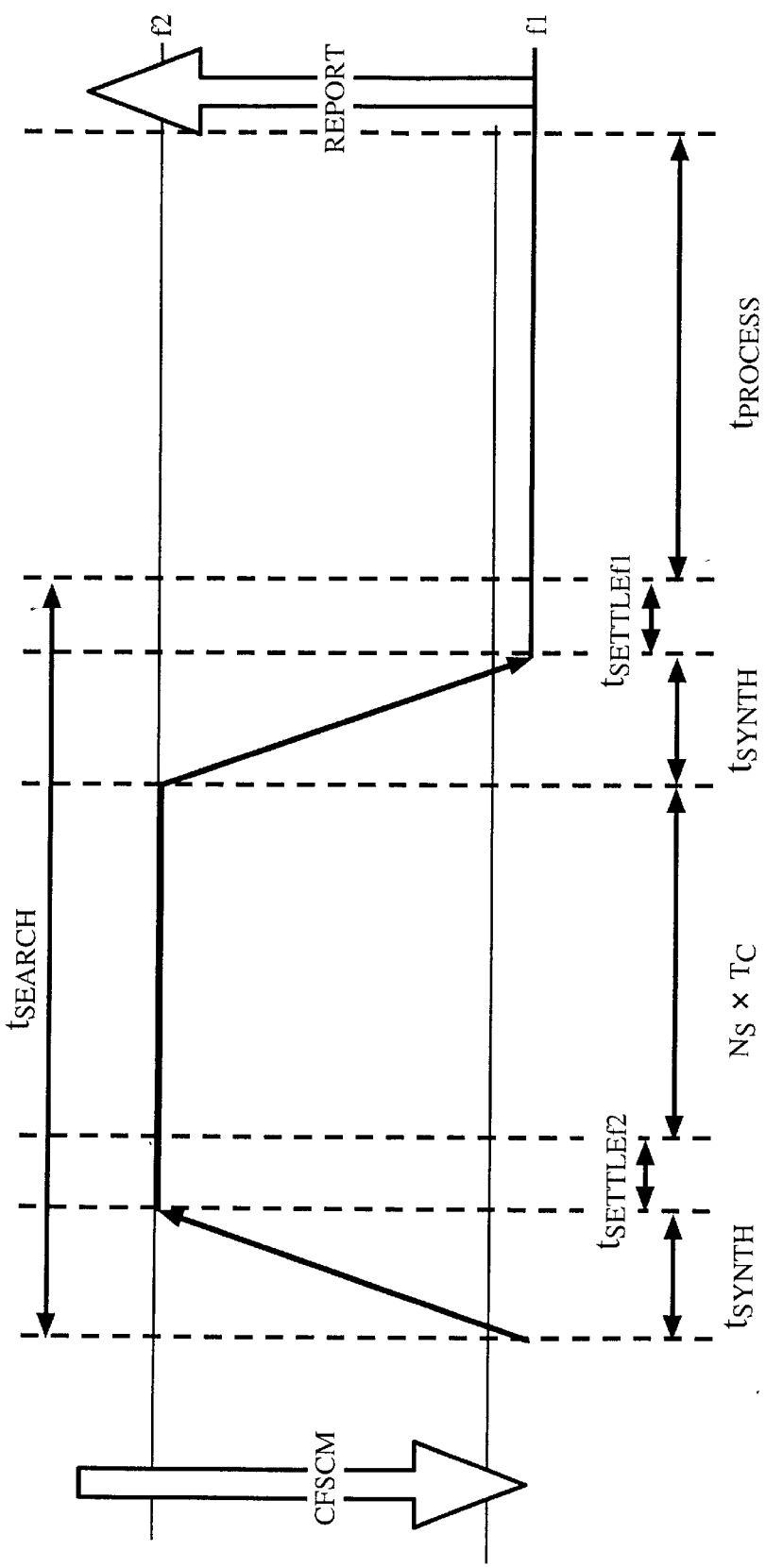
FIG. 3 is a timing diagram of an inter-frequency search excursion.

Referring next to FIG. 3, shown therein is a diagram of the different timing involved in performing a search excursion. While FIG. 3 would be self-explanatory to one of ordinary skill in the relevant art, a brief explanation is provided. The reference $t_{search}$ corresponds to the time required to collect the N samples on frequency f2. The total time will be $t_{search}$ plus the time it takes to process the samples after returning to the original frequency f1. The times $t_{synth}$ and $t_{settle}$ correspond to the time required to switch and settle at a new frequency, respectively. The time period of $N_s \times T_c$ represents the sampling time for $N_{samples}$, and $t_{process}$ represents the time to process the samples.

A method for minimizing the search time to another frequency can be described as follows:

First, the mobile station is currently demodulating an original or first frequency f1. An inter-frequency hard hand-off to a target frequency f2 might be required, such as when certain signal quality measurements (e.g., those noted above) fall below predetermined thresholds. When reporting such dropping quality to the base station 106a, the mobile station 102 is directed by the base station (e.g., via a Candidate Frequency Search Request/Control Message ("CFSCM")) to perform a search excursion to a target frequency f2.

The mobile station tunes to frequency f2 and collects N chip samples (a chip being one bit of pseudonoise at, for example, 1024 bps for orthogonally encoded symbols). The samples are stored in a memory buffer; the mobile station does not perform pilot searches and pilot strength measurements on frequency f1 while on frequency f2. The mobile station tunes back to the original frequency f1, resumes reception of forward link and transmission of reverse link, and processes the N samples collected on frequency f2 simultaneously.

The mobile station processes the samples collected on frequency f2 using a searcher that processes the stored samples while simultaneously processing the signal received on the original frequency f1. The mobile station reports to the base station the corresponding pilot strength measurements from frequency f2. One of skill in this technology will recognize the searcher referred to above and would have the requisite skill to provide or obtain the same.

Figure 4:
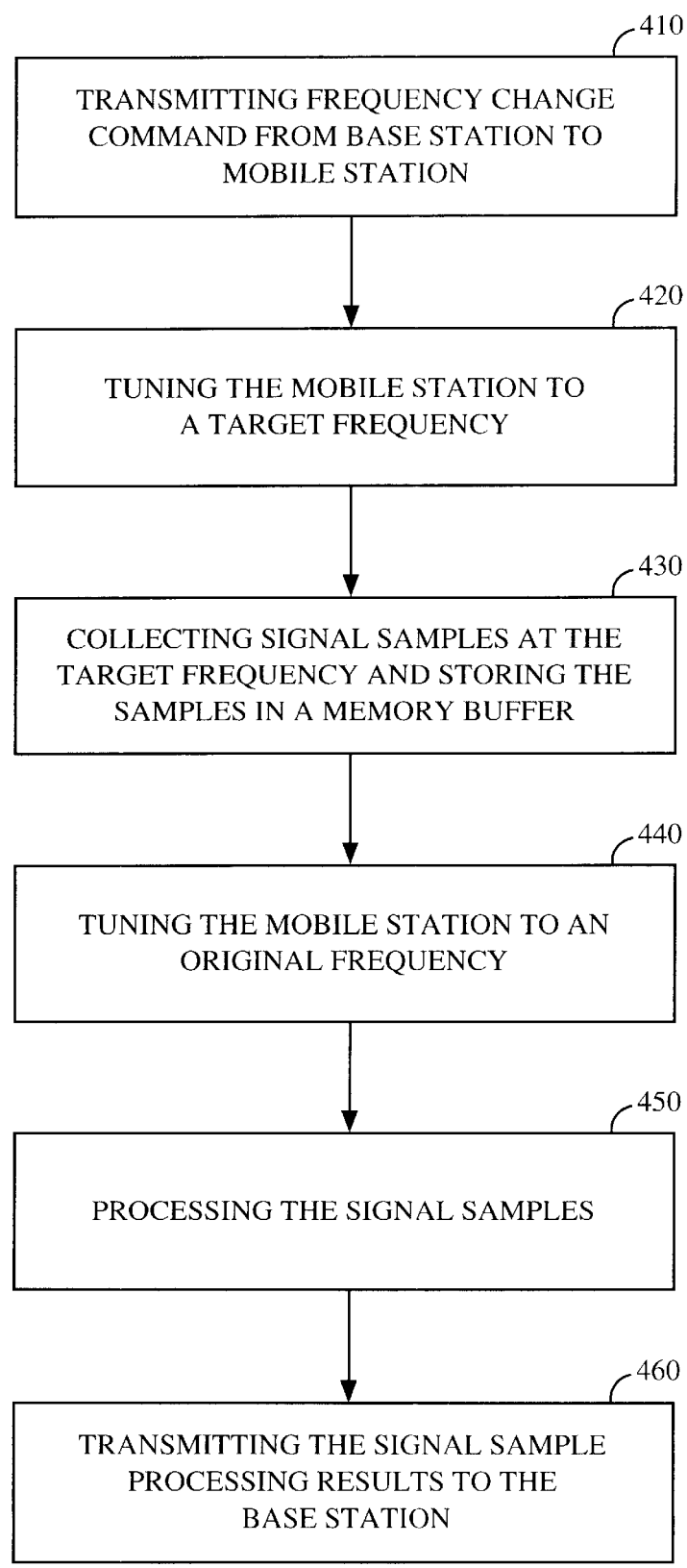
FIG. 4 is a flowchart of a method for performing a frequency search excursion under an embodiment of the invention.

The foregoing method is illustrated in FIG. 4 as a routine 400 that begins in step 410 where the base station 106a transmits a frequency change command to the mobile station 102 under a Candidate Frequency Search Request Control Message as defined by TIA/EIA-95-B Standard incorporated by reference. In response to this command, the mobile station 102 tunes to the target frequency f2 under step 420.

In step 430, the mobile station 102 collects signal samples at the target frequency f2 and locally stores the samples in the memory buffer 207. Under step 440, the mobile station 102 tunes back to the first frequency f1 and processes the signal samples stored in the memory buffer 207 under step 450. Note, steps 440 and 450 can be performed concurrently.

After the signal samples are processed as described above, the mobile station 102 under step 460 transmits the signal sample processing results to the base station 106a.

Minimizing Impact of Search Excursion on Current Frame

When the mobile station tunes to another frequency f2 to perform an inter-frequency search, forward link symbols transmitted by the base station during the $t_{search}$ time period cannot be received by the mobile station. Similarly, the mobile station does not transmit during $t_{search}$ and the base station loses reverse link symbols during the $t_{search}$ time period. To minimize the impact of this loss on both the current forward and reverse link frames, the mobile and base stations increase the amount of power allocated to the other symbols of the forward-error-correction-encoded and interleaved frame of symbols impacted by the search excursion. For the frame to be demodulated correctly, the additional amount of power required for symbols not impacted by the search excursion is a function of the search excursion time $t_{search}$, as noted herein.

Forward Link Power Control During Search Visit

To overcome the loss of forward link symbols during the $t_{search}$ time period, the mobile station increases the target $E_b/N_o$ of the forward link closed-loop fast power control by $\Delta_{target}$ dB.

This new target $E_b/N_o$ is set K power control groups (PCG) before the search excursion. The required number K of previous PCGs affected before the search excursion and the required increase in target $E_b/N_o$ ($\Delta$target) depends on the duration of the search excursion $t_{search}$; the longer $t_{search}$ is, the larger K. As a result of the increase in the target $E_b/N_o$, the forward link power will ramp-up prior to the inter-frequency search.

Figure 5:
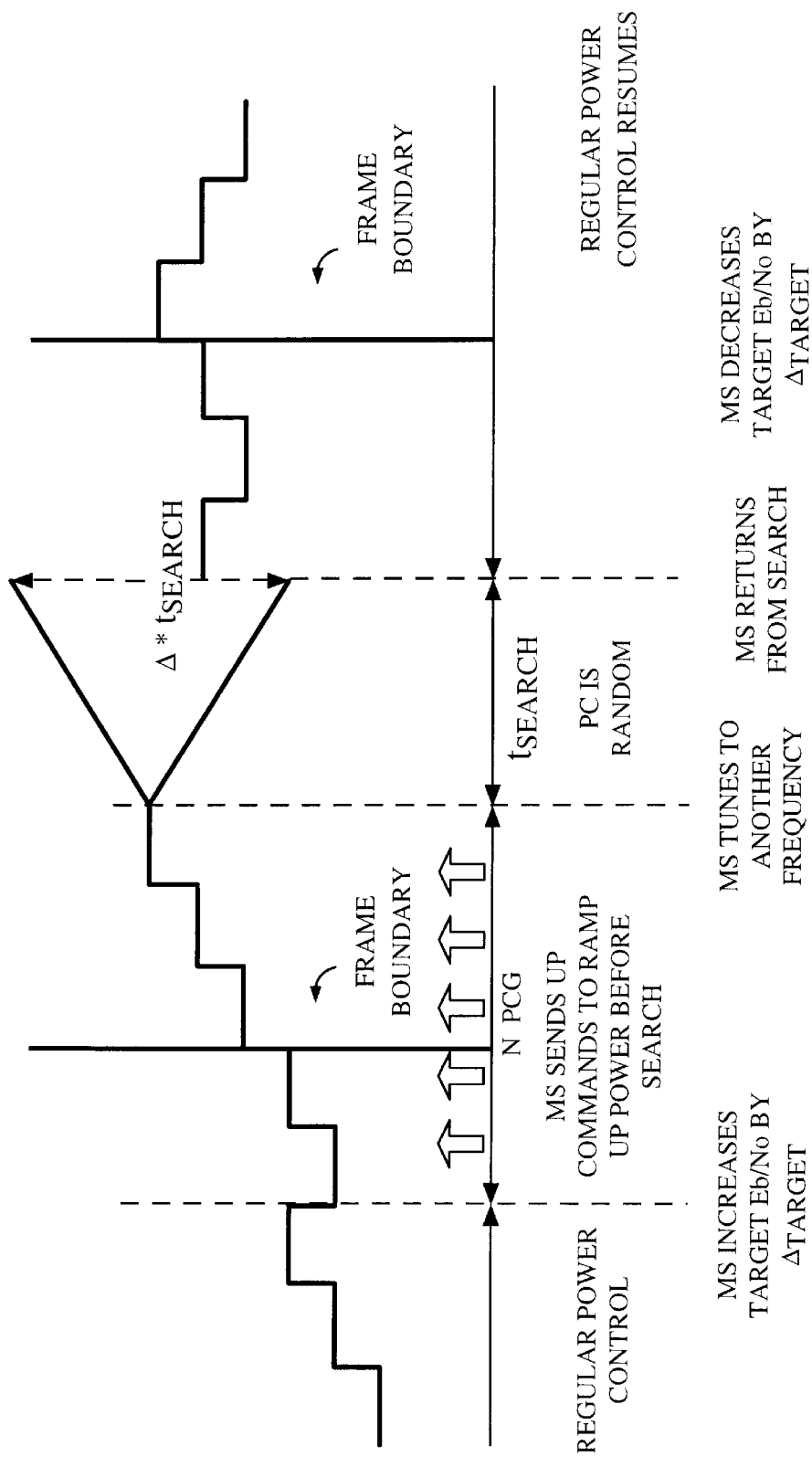
FIG. 5 is a graph of power versus time that illustrates the succession of forward link power levels related to inter-frequency search excursions.

FIG. 5 illustrates the succession of forward link power levels related to an interfrequency search excursion. Although FIG. 5 is self-explanatory to one of ordinary skill in the relevant art, a brief explanation is provided. After the search excursion, the mobile station 102 resumes demodulation of the forward link symbols of the current frame. At this stage the mobile station 102 knows the total symbol energy received in the current frame and can compare this to the required energy per frame to achieve the target frame error rate. The mobile station 102 can use this metric to increase or decrease the target $E_b/N_o$ for the remaining power control groups of the frame. If the search excursion expands over a frame boundary, the mobile station 102 may increase its target $E_b/N_o$ during the next frame to make up for the lost symbols in the first part of the frame. Details regarding closed loop power control can be found, for example, in U.S. patent application Ser. Nos. 08/752,860 and 08/879,274, entitled "METHOD AND APPARATUS FOR ADJUSTING THRESHOLDS AND MEASUREMENTS OF RECEIVED SIGNALS BY ANTICIPATING POWER CONTROL COMMANDS YET TO BE EXECUTED and METHOD AND APPARATUS FOR POWER ADAPTATION CONTROL AND CLOSED-LOOP COMMUNICATIONS" filed Nov. 20, 1996 and Jun. 20, 1997, now U.S. Pat. No. 6,075,974, issued Jun. 13, 2000 to Saints et al., and U.S. Pat. No. 5,982,760, issued Nov. 9, 1999, to Tao Chen, all respectively, and assigned to the assignee of this invention.

Reverse Link Power Control During Search Visit

While searching on the target frequency f2, the base station 106a will lose communication with the mobile station 102 and will not receive symbols during the $t_{search}$ time period. To overcome the loss of those symbols, the mobile station 102 can increase the total transmission power on the reverse link by a quantity $\Delta_{search}$ dB. The quantity $\Delta_{search}$ depends on the duration of the search $t_{search}$ and corresponds to the additional required symbol energy over the remainder of the frame to overcome the loss of symbols during $t_{search}$ and still permit the base station 106a to demodulate the frame correctly. The base station 106a can inform the mobile station 102 of the maximum tolerable increase $\Delta_{search}$ dB in the message directing the mobile station to perform an inter-frequency search (e.g., in the ("FCSM")). This value can depend on the maximum tolerable interference currently determined by the base station 106a.

Figure 6:
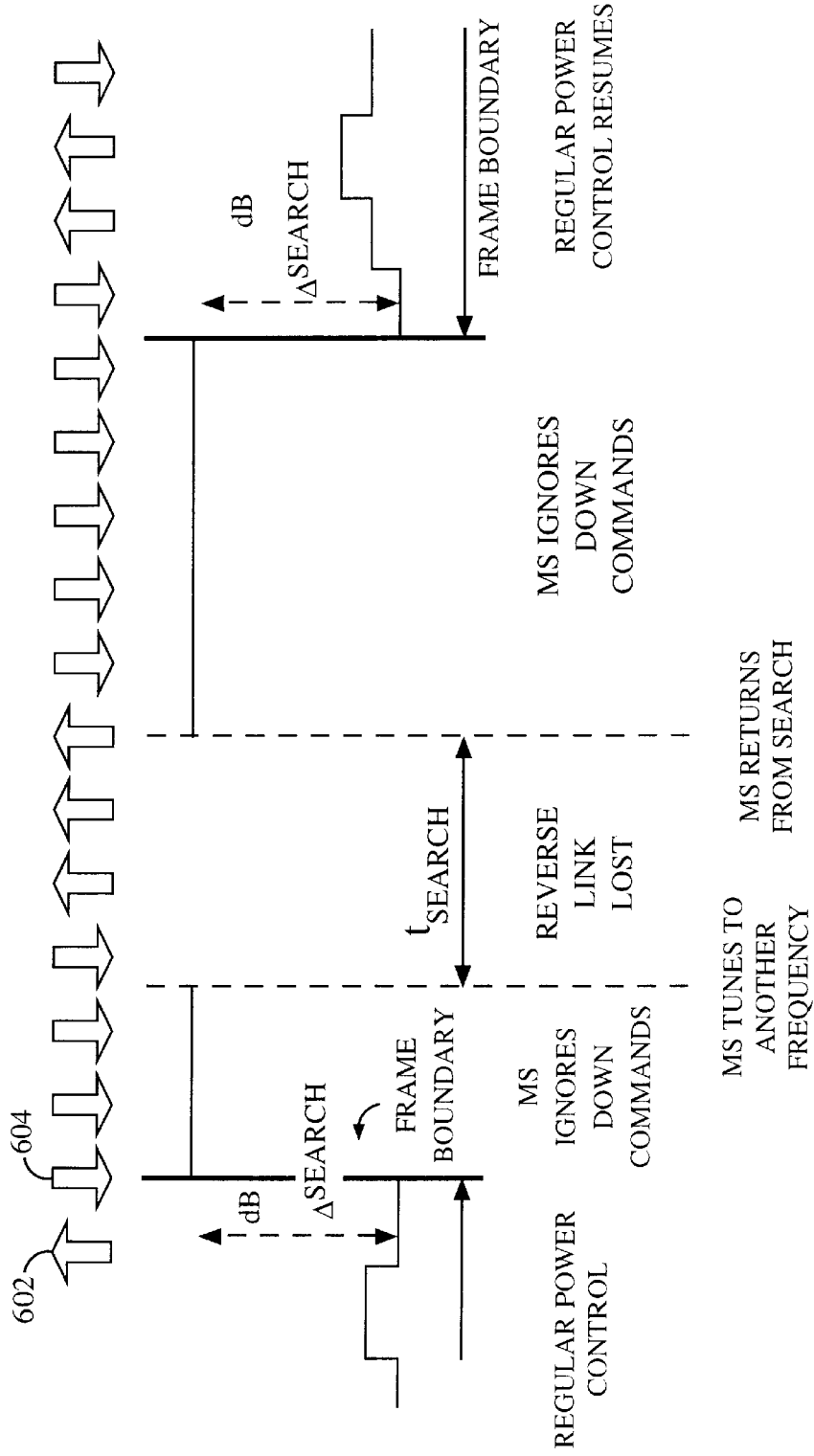
FIG. 6 is a graph of power versus time that illustrates a reverse link power increase during search excursion.

FIG. 6 illustrates the succession of reverse link power increases during a search excursion. While FIG. 6 would be self-explanatory to one of ordinary skill in the relevant art, a brief explanation is provided. During the inter-frequency search frame, transmitted with a power increase, the base station 106a will send down commands ordering the mobile station 102 to reduce its power. The mobile station 102 simply ignores those down commands until the end of inter-frequency search frame, as shown in FIG. 6. These up and down commands are represented by the large arrows 602, 604, respectively, in FIG. 6. If the search excursion expands over a frame boundary, the mobile station 102 can increase its total transmit power during the next frame in a fashion similar to that noted above to overcome the loss of the initial symbols of the next frame. Regular power control resumes after the frame boundary, as shown in FIG. 6.

Figure 7:
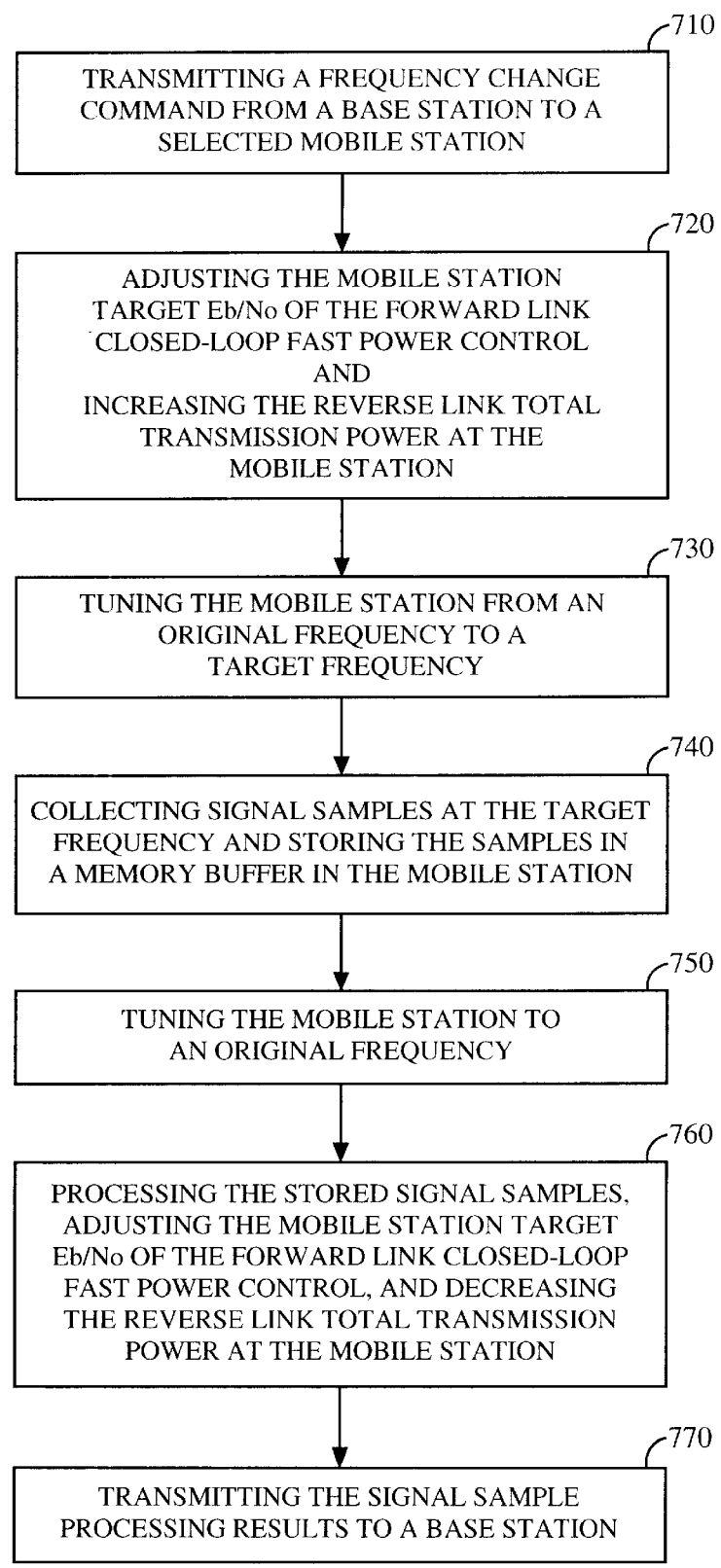
FIG. 7 is a flowchart of a method for performing a frequency search excursion while minimizing disruption of service in accordance with another embodiment of the invention

Thus, the method described previously with respect to FIG. 4 can be modified to ensure uninterrupted communication during a search excursion. FIG. 7 shows the steps of the modified method, beginning with step 710, where the base station 106a transmits the frequency change command (FCSM) to the mobile station 102.

Before the mobile station 102 tunes to the target frequency, the target $E_b/N_o$ of the forward link closed-loop fast power control is increased from a first level to a second level as described above. The mobile station 102 increases the total transmission power on the reverse link by a quantity $\Delta_{search}$ dB, as also described above and illustrated in step 720.

The mobile station then tunes to the target frequency and collects target frequency signal samples, such as chip sample data, and stores the signal samples in the memory 207, under steps 730–740.

In step 750, the mobile station 102 tunes back to the first frequency when the collection of signal samples is complete. The mobile station 102 processes the signal samples in the memory buffer and resumes communication with the base station 106a at the first frequency f1. In resuming communications, the mobile station 102 adjusts the target $E_b/N_o$ of the remaining power control groups in the frame, and then reduces the target $E_b/N_o$ by $\Delta_{target}$ and the reverse link total transmission power resumes regular control, as illustrated in step 760.

Finally, under 770, the signal sample processing results, such as at the pilot strength measurements, are transmitted to the base station.

Offline Search Method with Multi-Channel Reverse Link

A problem that may be encountered in application of the foregoing is a result of the closed loop power control. During the period in which the mobile station increases its transmission energy to compensate for the period of time in which it is offline, the receiving base station will detect the energy of the received signal to be too high. In response, the base station will transmit a series of down commands to the mobile station that may cause the energy of the reverse link transmission boost to be curtailed to early to fully compensate for the time period in which the mobile station is performing offline searching.

In the present exemplary embodiment, mobile station 850 transmits a plurality of channels including a pilot channel and at least one information channel. In the exemplary embodiment, base stations 106a and 106b determine the adequacy of the transmission energy of the reverse link signal in accordance with the received energy of the reverse link pilot signal. The reason that, in the exemplary embodiment, the pilot channel energy is used to determine the closed loop power control commands is that the pilot channel energy is not rate dependent. Thus, in the preferred embodiment of the present invention, the pilot channel transmission power is retained at the level it was prior to the frequency search excursion, while increasing the transmission energy of at least one other channel transmitted by the mobile station.

Figure 8:
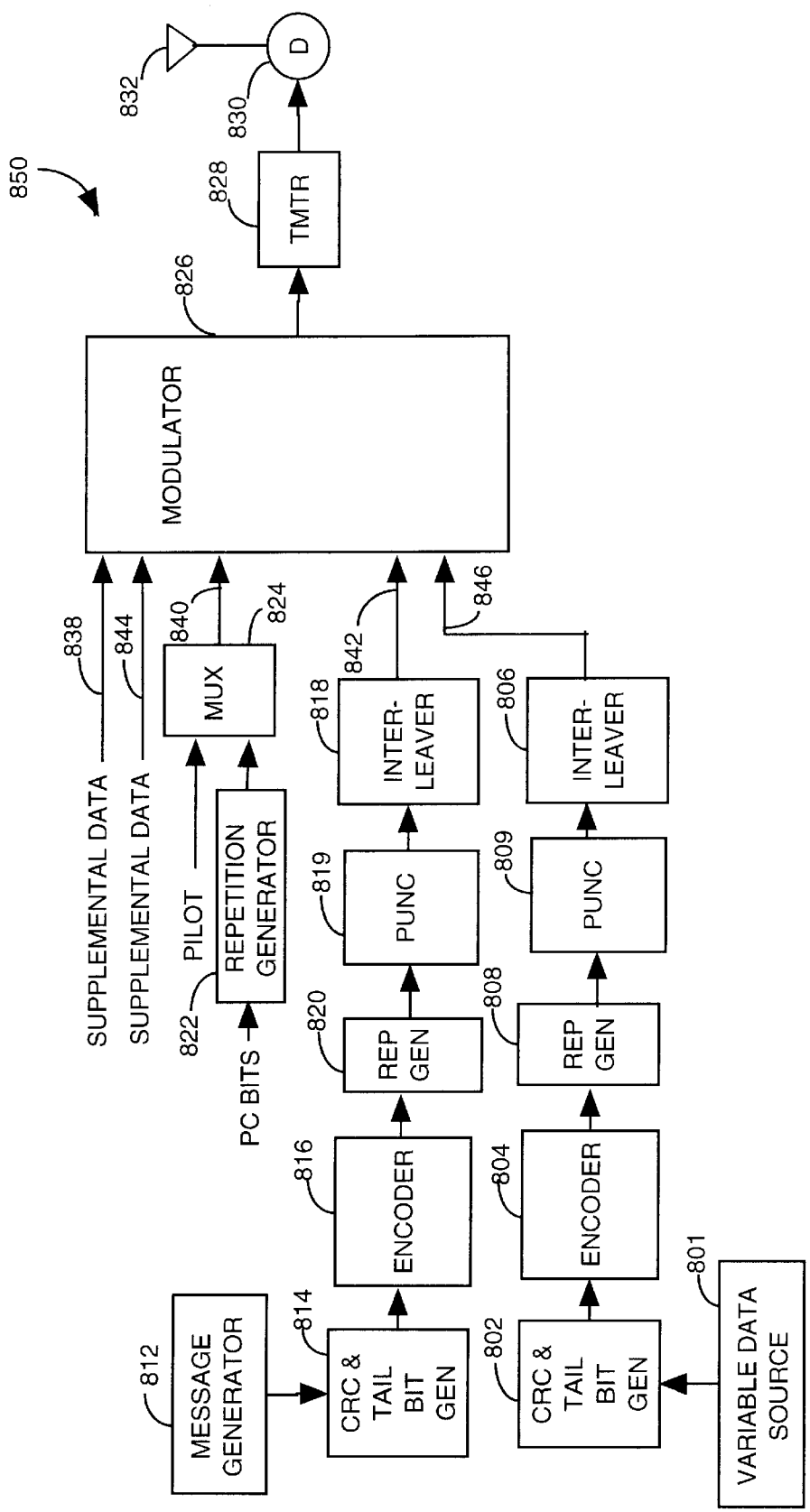
FIG. 8 is a diagram illustrating the multi-channel remote station of the present invention.

FIG. 8 illustrates a functional block diagram of an exemplary embodiment of mobile station 850. It will also be understood that various of the functional blocks shown in FIG. 8 may not be present in other embodiments of the present invention. The functional block diagram of FIG. 8 corresponds to an embodiment that is useful for operation according to the TIA/EIA Standard IS-95C, also referred to as IS-2000. Other embodiments of. the present invention are useful for other standards including Wideband CDMA (WCDMA) standards as proposed by the standards bodies ETSI and ARIB. It will be understood by one skilled in the art that owing to the extensive similarity between the reverse link modulation in the WCDMA standards and the reverse link modulation in the IS-95C standard, extension of the present invention to the WCDMA standards is easily accomplished.

In the exemplary embodiment of FIG. 8, the wireless communication device transmits a plurality of distinct channels of information which are distinguished from one another by short orthogonal spreading sequences as described in the aforementioned U.S. Pat. No. 6,396,804. Five separate code channels are transmitted by the wireless communication device: 1) a first supplemental data channel 838, 2) a time multiplexed channel of pilot and power control symbols 840, 3) a dedicated control channel 842, 4) a second supplemental data channel 844 and 5) a fundamental channel 846. The first supplemental data channel 838 and second supplemental data channel 844 carry digital data which exceeds the capacity of the fundamental channel 846 such as facsimile, multimedia applications, video, electronic mail messages or other forms of digital data. The multiplexed channel of pilot and power control symbols 840 carries pilots symbols to allow for coherent demodulation of the data channels by the base station and power control bits to control the energy of transmissions of the base station or base stations in communication with mobile station 850. Control channel 842 carries control information to the base station such as modes of operation of wireless communication device 850, capabilities of mobile station 850 and other necessary signaling information. Fundamental channel 846 is the channel used to carry primary information from the mobile station to the base station. In the case of speech transmissions, the fundamental channel 846 carries the speech data.

Supplemental data channels 838 and 844 are encoded and processed for transmission by means not shown and provided to modulator 826. Power control bits are provided to repetition generator 822, which provides repetition of the power control bits before providing the bits to multiplexer (MUX) 824. In multiplexer 824, the redundant power control bits are time multiplexed with pilot symbols and provided on line 840 to modulator 826.

Message generator 812 generates necessary control information messages and provides the control message to CRC and tail bit generator 814. CRC and tail bit generator 814 appends a set of cyclic redundancy check bits which are parity bits used to check the accuracy of the decoding at the base station and appends a predetermined set of tail bits to the control message to clear the memory of the decoder at the base station receiver subsystem. The message is then provided to encoder 816, which provides forward error correction coding upon the control message. The encoded symbols are provided to repetition generator 820 which repeats the encoded symbols to provide additional time diversity in the transmission. Following repetition generator certain symbols are punctured according to some predetermined puncturing pattern by puncturing element (PUNC) 819 to provide a predetermined number of symbols within the frame. The symbols are then provided to interleaver 818 which reorders the symbols in accordance with a predetermined interleaving format. The interleaved symbols are provided on line 842 to modulator 826.

Variable rate data source 801 generates variable rate data. In the exemplary embodiment, variable rate data source 801 is a variable rate speech encoder such as described in aforementioned U.S. Pat. No. 5,414,796. Variable rate speech encoders are popular in wireless communications because their use increases the battery life of wireless communication devices and increases system capacity with minimal impact on perceived speech quality. The Telecommunications Industry Association has codified the most popular variable rate speech encoders in such standards as Interim Standard IS-96 and Interim Standard IS-733. These variable rate speech encoders encode the speech signal at four possible rates referred to as full rate, half rate, quarter rate or eighth rate according to the level of voice activity. The rate indicates the number of bits used to encode a frame of speech and varies on a frame by frame basis. Full rate uses a predetermined maximum number of bits to encode the frame, half rate uses half the predetermined maximum number of bits to encode the frame, quarter rate uses one quarter the predetermined maximum number of bits to encode the frame and eighth rate uses one eighth the predetermined maximum number of bits to encode the frame.

Variable rate date source 801 provides the encoded speech frame to CRC and tail bit generator 802. CRC and tail bit generator 802 appends a set of cyclic redundancy check bits which are parity bits used to check the accuracy of the decoding at the base station and appends a predetermined set of tail bits to the control message in order to clear the memory of the decoder at the base station. The frame is then provided to encoder 804, which provides forward error correction coding on the speech frame. The encoded symbols are provided to repetition generator 808 which provides repetition of the encoded symbol. Following repetition generator certain symbols are punctured by puncturing element 809 according to a predetermined puncturing pattern to provide a predetermined number of symbols within the frame. The symbols are then provided to interleaver 806 which reorders the symbols in accordance with a predetermined interleaving format. The interleaved symbols are provided on line 846 to modulator 826.

In the exemplary embodiment, modulator 826 modulates the data channels in accordance with a code division multiple access modulation format and provides the modulated information to transmitter (TMTR) 828, which amplifies and filters the signal and provides the signal through duplexer 830 for transmission through antenna 832.

In IS-95 and cdma2000 systems, a 20 ms frame is divided into sixteen sets of equal numbers of symbols, referred to as power control groups. The reference to power control is based on the fact that for each power control group, the base station receiving the frame issues a power control command in response to a determination of the sufficiency of the received reverse link signal at the base station.

Figure 9:
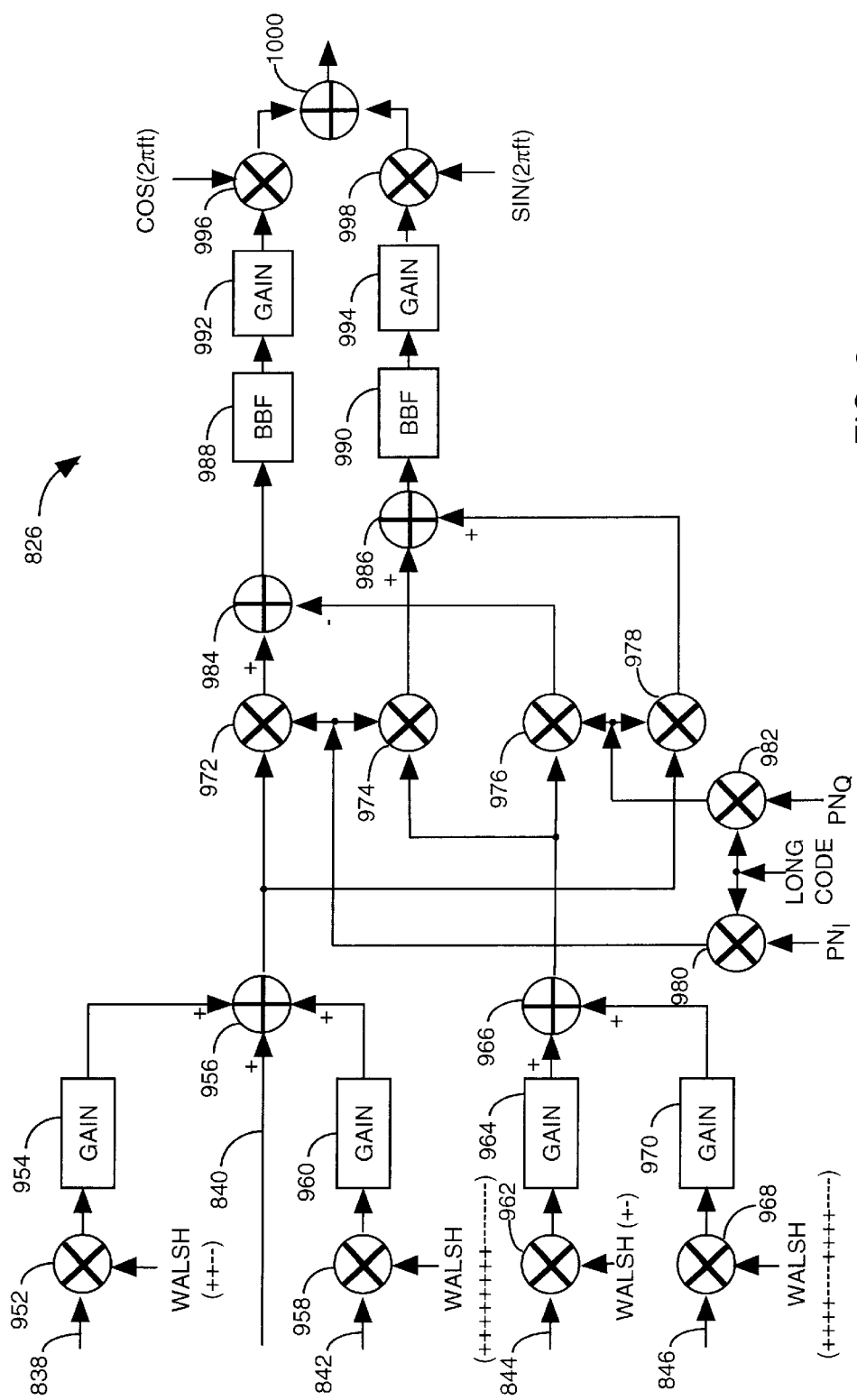
FIG. 9 is a diagram illustrating the reverse link modulator of the present invention.

FIG. 9 illustrates a functional block diagram of an exemplary embodiment of modulator 826 of FIG. 8. The first supplemental data channel data is provided on line 838 to spreading element 952, which covers the supplemental channel data in accordance with a predetermined spreading sequence. In the exemplary embodiment, spreading element 952 spreads the supplemental channel data with a short Walsh sequence (++−−). The spread data is provided to relative gain element 954, which adjusts the gain of the spread supplemental channel data relative to the energy of the pilot and power control symbols. The gain adjusted supplemental channel data is provided to a first summing input of summer 956. The pilot and power control multiplexed symbols are provided on line 840 to a second summing input of summing element 956.

Control channel data is provided on line 842 to spreading element 958 which covers the supplemental channel data in accordance with a predetermined spreading sequence. In the exemplary embodiment, spreading element 958 spreads the supplemental channel data with a short Walsh sequence (++++++++−−−−−−−−). The spread data is provided to relative gain element 960, which adjusts the gain of the spread control channel data relative to the energy of the pilot and power control symbols. The gain adjusted control data is provided to a third summing input of summer 956.

Summing element 956 sums the gain adjusted control data symbols, the gain adjusted supplemental channel symbols and the time multiplexed pilot and power control symbols and provides the sum to a first input of multiplier 972 and a first input of multiplier 978.

The second supplemental channel is provided on line 844 to spreading element 962, which covers the supplemental channel data in accordance with a predetermined spreading sequence. In the exemplary embodiment, spreading element 962 spreads the supplemental channel data with a short Walsh sequence (+−). The spread data is provided to relative gain element 964, which adjusts the gain of the spread supplemental channel data. The gain adjusted supplemental channel data is provided to a first summing input of summer 966.

The fundamental channel data is provided on line 846 to spreading element 968 which covers the fundamental channel data in accordance with a predetermined spreading sequence. In the exemplary embodiment, spreading element 968 spreads the fundamental channel data with a short Walsh sequence (++++−−−−++++−−−−). The spread data is provided to relative gain element 970, which adjusts the gain of the spread fundamental channel data. The gain adjusted fundamental channel data is provided to a second summing input of summer 966.

Summing element 966 sums the gain adjusted second supplemental channel data symbols and the fundamental channel data symbols and provides the sum to a first input of multiplier 974 and a first input of multiplier 976.

In the exemplary embodiment, a pseudonoise spreading using two different short PN sequences ($PN_I$ and $PN_Q$) is used to spread the data. In the exemplary embodiment the short PN sequences, $PN_I'$ and $PN_Q'$, are multiplied by a long PN code to provide additional privacy. The generation of pseudonoise sequences is well known in the art and is described in detail in aforementioned U.S. Pat. No. 5,103,459. A long PN sequence is provided to a first input of multipliers 980 and 982. The short PN sequence $PN_I$ is provided to a second input of multiplier 980 and the short PN sequence $PN_Q$ is provided to a second input of multiplier 982.

The resulting PN sequence from multiplier 980 is provided to respective second inputs of multipliers 972 and 974. The resulting PN sequence from multiplier 982 is provided to respective second inputs of multipliers 976 and 978. The product sequence from multiplier 972 is provided to the summing input of subtractor 984. The product sequence from multiplier 974 is provided to a first summing input of summer 986. The product sequence from multiplier 976 is provided to the subtracting input of subtractor 984. The product sequence from multiplier 978 is provided to a second summing input of summer 986.

The difference sequence from subtractor 984 is provided to baseband filter 988. Baseband filter 988 performs necessary filtering on the difference sequence and provides the filtered sequence to gain element 992. Gain element 992 adjusts the gain of the signal and provides the gain adjusted signal to upconverter 996. Upconverter 996 upconverts the gain adjusted signal in accordance with a Quadrature Phase Shift Keying,QPSK, modulation format and provides the unconverted signal to a first input of summer 1000.

The sum sequence from summer 986 is provided to baseband filter 990. Baseband filter 990 performs necessary filtering on difference sequence and provides the filtered sequence to gain element 994. Gain element 994 adjusts the gain of the signal and provides the gain adjusted signal to upconverter 998. Upconverter 998 upconverts the gain adjusted signal in accordance with a QPSK modulation format and provides the upconverted signal to a second input of summer 1000. Summer 1000 sums the two QPSK modulated signals and provides the result to transmitter 828.

As described above, when mobile station 850 tunes to another frequency f2 to perform an inter-frequency search, forward link symbols transmitted by the base station during the $t_{search}$ time period cannot be received by the mobile station. Similarly, mobile station 850 does not transmit during $t_{search}$ and the base station loses reverse link symbols during the $t_{search}$ time period.

While searching on the target frequency f2, the base station 106a will lose communication with the mobile station 850 and will not receive symbols during the $t_{search}$ time period. To overcome the loss of those symbols, mobile station 850 increases the transmission power of the information channels, including the first supplemental channel 838, second supplemental channel 844, control channel 842 and fundamental channel 846, while keeping the transmission power of the multiplexed power control command and pilot symbol channel 840 at levels previous to the offline search.

The quantity $\Delta_{search}$ depends on the duration of the search $t_{search}$ and corresponds to the additional required symbol energy over the remainder of the frame to overcome the loss of symbols during $t_{search}$ and still permit the base station 106a to demodulate the frame correctly. The base station 106a can inform the mobile station 850 of the maximum tolerable increase $\Delta_{search}$ dB in the message directing the mobile station to perform an inter-frequency search (e.g., in the ("FCSM")). This value can depend on the maximum tolerable interference currently determined by the base station 106a.

Upon returning from the offline search algorithm, gain elements 954, 960, 964 and 970 are provided with control signals increasing the gains of those channels by $\Delta_{search}$ dB. However, the transmission energy of the pilot channel is not effected. Because the reverse link power control commands are generated in accordance with the received energy of the reverse link pilot signal, the closed loop power control commands will not be responsive to the increase $\Delta_{search}$ dB provided to compensate for the offline search.

In a preferred embodiment, mobile station 850 is able to respond to the condition in which although it cannot increase the transmission power of all of its transmitted information channels by $\Delta_{search}$ dB. Mobile station 850 may not be able to increase the transmission energy of the information channels because of limits on its power supply. In the preferred embodiment, mobile station 850 ranks the channels it is transmitting in accordance with the importance that its reverse link transmission not be interrupted. Factors that may figure into the ranking may include the kind of data being transmitted, the availability of retransmission protocols, the type of forward error correction being provided, etc. Mobile station 850 then increases the transmission power of these channels in accordance with this ranking.

The base station 106a and the mobile stations 102 and 850 can be configured to accomplish the foregoing process. Source code to accomplish the foregoing can be readily generated by those of ordinary skill in this technology based on the detailed description provided herein.

While a preferred embodiment of the invention has been illustrated and described above, it is to be understood that various changes may be made therein without departing from the spirit and scope of the invention. For example, the mobile stations 102 and 850 can use the state of its long code mask to select a starting position within a frame to perform the inter-frequency search. The mobile stations 102 and 850 can select a randomization period such that the inter-frequency search would typically not expand over a frame. Randomizing the search excursion position between different mobile stations will reduce the reverse link interference and will decrease the total power requirement on the forward link. Consequently, the invention is to be limited only by the scope of the claims that follow.

Although specific embodiments of, and examples for, the invention are described herein for illustrative purposes, various equivalent modifications can be made without departing from the scope of the invention, as will be recognized by those skilled in the relevant art. For example, embodiments are generally shown and described as being implemented in software and performed by a processor. Such software can be stored on any suitable computer-readable medium, such as macrocode stored in a semiconductor chip, computer-readable disk, or downloaded and stored from a server. The invention could equally be implemented in hardware, such as by a DSP or ASIC.

The teachings provided herein of the invention can be applied to other communications systems, not necessarily the illustrated communication system described above. For example, while the invention has been generally described above as being employed in the CDMA communication system 100, the invention is equally applicable to other digital or analog cellular communication systems. The invention can be modified to employ aspects of the systems, circuits, and concepts of the various patents and standards described above, all of which are incorporated by reference.

These and other changes can be made to the invention in light of the above detailed description. In general, in the following claims, the terms should not be construed to limit the invention to the specific embodiments disclosed in the specification and the claims. Accordingly, the invention is not limited by the disclosure, but instead its scope is to be determined entirely by the following claims.

What is claimed is:

1. A method for minimizing frequency search time in a wireless communications system having a user station exchanging communications with a base station, the method comprising:

tuning the user station to a target frequency from an original frequency and collecting and storing signal samples from the target frequency;

tuning the user station to the original frequency and processing the stored samples;

transmitting sample processing results to the base station; and allocating additional power to frame symbols on information channels in order to minimize the effect of lost forward and reverse link symbols caused by tuning the user station to the target frequency.

2. The method of claim 1 further comprising the step of keeping the transmission energy of a pilot channel equal to the transmission energy of the pilot channel prior to tuning the user station to the target frequency.

3. The method of claim 1 further comprising the steps of:

determining whether said user station is capable of increasing the transmission power of said information channels to a desired extent;

selectively increasing the transmission power of said information channels when said user station is not capable of increasing the transmission power of said information channels to the desired extent.

4. The method of claim 3, wherein selectively increasing the transmission power of said information channels, comprises the steps of:

ranking the channels in accordance with the importance of having a non interrupted reverse link transmission; and adjusting the transmission power of said information channels in accordance with said ranking.

5. The method of claim 1 wherein said information channels comprise: a control channel, at least one supplemental channel, and a fundamental channel.

6. At a mobile station, a method for maintaining a frame error rate of a current transmission frame during a frequency search excursion, comprising:

detecting a search excursion direction from a base station;

increasing a transmission power level of the current transmission frame to a predetermined amount;

ignoring a plurality of transmission power control signals from the base station in order to maintain the transmission power level at the predetermined amount for a predetermined time period; and performing the frequency search excursion for a designated time period.

7. The method of claim 6, wherein the predetermined amount and the predetermined time period are chosen in accordance with the designated time period for which the frequency search excursion is performed.

8. The method of claim 6, wherein after performing the frequency search excursion, the method for maintaining the frame error rate of the current transmission frame during the frequency search excursion further comprises:

increasing the transmission power level of the current transmission frame to a second predetermined level; and ignoring a second plurality of transmission power control signals from the base station in order to maintain the transmission power level at the second predetermined level for a second predetermined time period.

9. The method of claim 8, wherein the second predetermined amount and the second predetermined time period are chosen in accordance with the designated time period for which the frequency search excursion was performed.

10. The method of claim 6, wherein the method is performed for each current transmission frame of a plurality of channels.

11. The method of claim 6, wherein the method is performed for each current transmission frame of a plurality of channels in accordance with an assigned ranking for each channel, wherein the assigned rankings determine the predetermined amounts to which the transmission power levels of each of the plurality of channels have been increased.

12. At a mobile station, a method for maintaining a frame error rate for a forward link signal when performing a frequency search excursion, comprising:

receiving a search excursion direction from a base station;

transmitting a power control message to the base station, wherein the power control message is for increasing the current transmission power level of the forward link information channels to a designated target level that is dependent upon a search excursion duration; and performing the frequency search excursion over the search excursion duration.

13. The method of claim 12, wherein if the search excursion duration extends over a frame boundary, the method further comprises transmitting another power control message to the base station after performing the frequency search excursion, wherein the power control message is for increasing the current transmission power level of the forward link signal to the designated target level.

14. At a mobile station, apparatus for maintaining a frame error rate of a current transmission frame during a frequency search excursion, comprising:

means for detecting a search excursion direction from a base station;

means for increasing a transmission power level of the current transmission frame to a predetermined amount;

means for ignoring a plurality of transmission power control signals from the base station in order to maintain the transmission power level at the predetermined amount for a predetermined time period; and means for performing the frequency search excursion for a designated time period.

15. At a mobile station, apparatus for maintaining a frame error rate of a current transmission frame during a frequency search excursion, comprising:

a receiver subsystem for detecting a search excursion direction from a base station; and a processing subsystem coupled to the receiver subsystem, wherein the processing subsystem is configured to increase a transmission power level of the current transmission frame to a predetermined amount when the search excursion direction is received from the base station, to ignore a plurality of transmission power control signals from the base station in order to maintain the transmission power level at the predetermined amount for a predetermined time period, and to control the frequency search excursion for a designated time period.

16. Apparatus for minimizing frequency search time in a wireless communications system having a user station exchanging communications with a base station, the method comprising:

means for tuning the user station to a target frequency from an original frequency and collecting and storing signal samples from the target frequency;

means for tuning the user station to the original frequency and processing the stored samples;

means for transmitting sample processing results to the base station; and means for allocating additional power to frame symbols on information channels in order to minimize the effect of lost forward and reverse link symbols caused by tuning the user station to the target frequency.

17. A method for performing handoff comprising:

tuning to a target frequency from an original frequency;

collecting and storing signal samples received at the target frequency during a search excursion period;

tuning to the original frequency; and increasing a transmission power of at least one channel in relation to a pilot channel transmission power from a pre-excursion transmission power to a post-excursion transmission power, wherein the difference between the pre-excursion transmission power and the post-excursion power is based on the duration of the search excursion period.

18. The method of claim 17 further comprising:

processing the stored samples; and transmitting sample processing results to a base station.

19. The method of claim 17 further comprising transmitting the at least one channel prior to the tuning to a target frequency at the pre-excursion transmission power.

20. The method of claim 17 further comprising selecting the at least one channel to be transmitted at the post-excursion power from a plurality of non-pilot information channels.

21. The method of claim 17 further comprising:

prior to the search excursion period, transmitting a pilot channel at a pre-excursion pilot power; and immediately after the increasing, transmitting the pilot channel at the pre-excursion pilot power.

* * * * *